June 23, 1936.  J. W. TONG ET AL  2,045,169
AUTOMOBILE CONTROL DEVICE
Filed Feb. 3, 1936
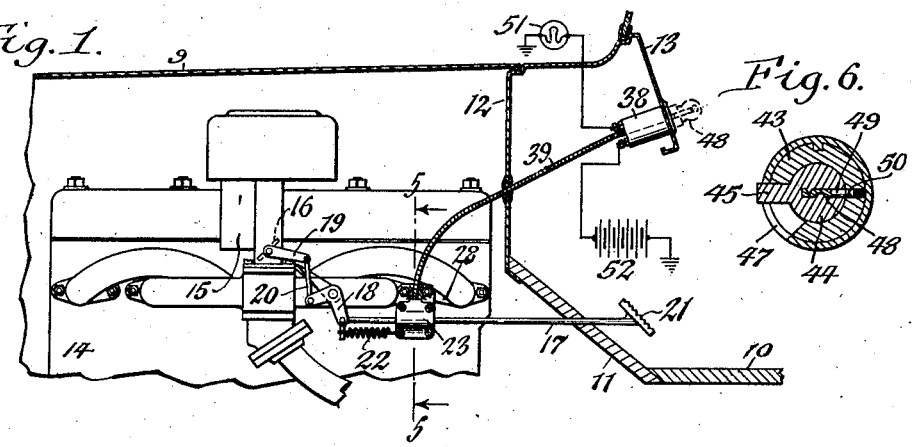
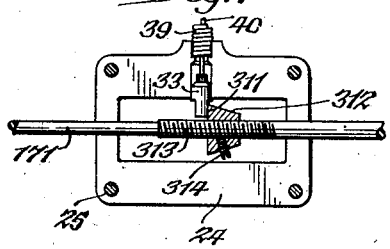
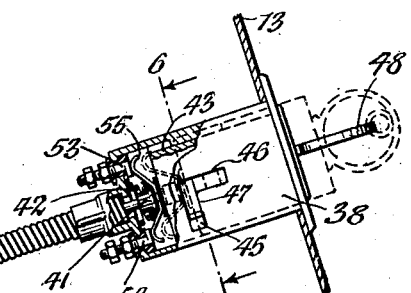
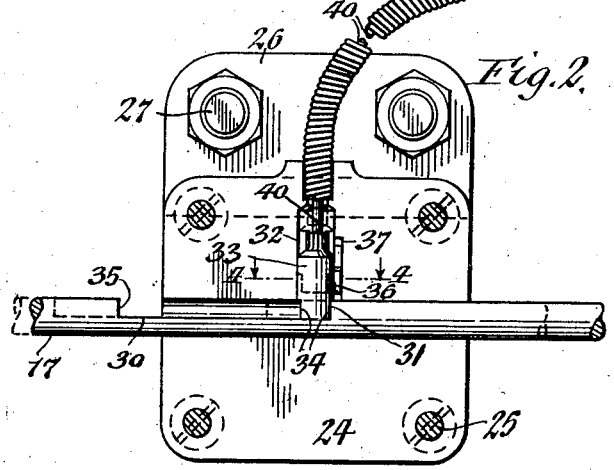
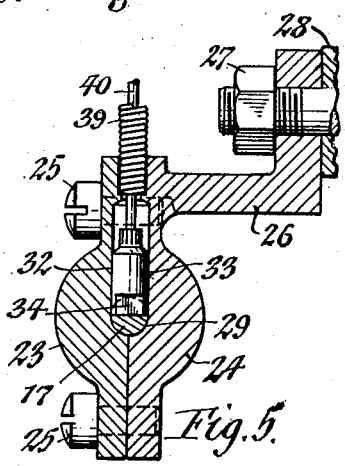
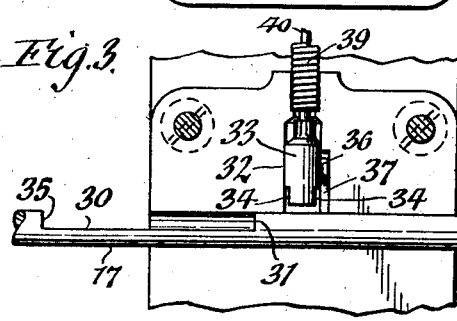
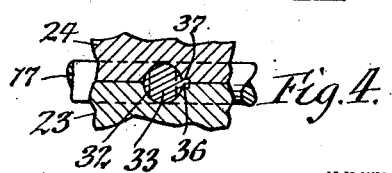
INVENTORS
John W. Tong
Chester O. Thompson
BY
ATTORNEYS.

Patented June 23, 1936

2,045,169

UNITED STATES PATENT OFFICE 2,045,169

AUTOMOBILE CONTROL DEVICE

John W. Tong and Chester O. Thompson, Buffalo, N. Y.

Application February 3, 1936, Serial No. 62,218

1 Claim. (Cl. 74—482)

This invention relates to a device for controlling the operation of an automobile and prevent the same from being driven in excess of a predetermined speed and also to indicate that the automobile is not running above such speed.

The means now in common use for operating an automobile are so organized that fuel may be supplied to the engine at all times for operating the automobile at a speed far in excess of that which is regarded as safe in certain localities, such operation of the automobile being often effected by the driver without being aware of the dangerous speed at which the automobile is traveling at a particular time.

One of the objects of this invention is to provide an improved control device whereby during normal driving of an automobile fuel may be supplied to the engine for operating the automobile only up to a speed which is regarded as safe for certain conditions or locations but when the automobile is operated in territory where no restriction is necessary it is possible to eliminate the effect of this control device and supply the engine with a greater amount of fuel for driving the automobile at as high a speed as possible.

A further object of this invention is to combine with said fuel control device means which indicate to observers along the roadway that the control device has been set to prevent driving the car at a rate of speed in excess of that which is regarded as safe.

In the accompanying drawing:—

Fig. 1 is a fragmentary side view, partly in section, of an automobile showing the engine thereof equipped with an approved form of this invention.

Fig. 2 is a fragmentary, longitudinal sectional view of the control device on an enlarged scale, showing the stop means thereof in an operative position.

Fig. 3 is a similar view showing the stop means in an inoperative position.

Fig. 4 is a cross section taken on the correspondingly numbered line in Fig. 2.

Fig. 5 is a cross section, on an enlarged scale, taken on line 5—5, Fig. 1.

Fig. 6 is a cross section, taken on line 6—6, Fig. 2.

Fig. 7 is a fragmentary view similar to Fig. 2 showing a modified form of this invention.

In the following description like characters of reference indicate like parts of the several figures of the drawing.

Although this invention is intended to be utilized in automobiles of various constructions that shown in Fig. 1, as a suitable example, comprises a horizontal floor 10, an inclined footboard 11 at the front end of the floor, an upright front wall 12 rising from the front end of the footboard, an instrument panel 13 arranged in front of the wall 12, a hood 9 arranged in front of the instrument panel, and an engine having cylinders 14 arranged below the head, and means for supplying liquid fuel to the cylinders including a carburetor 15 receiving the fuel from any suitable source and delivering the same to the cylinders, a control valve 16 arranged in the fuel conduit leading from the carburetor to the cylinders, and a longitudinally reciprocable control or accelerator rod 17 passing through the footboard and operatively connected at its front end with the valve 16 by a rock lever 18, a rock arm 19 and a link 20, and a footpiece or pedal 21 mounted on the rear end of the control rod.

Upon pushing the control rod forwardly by pressure of the foot on the pedal the delivery of fuel to the cylinders is increased and the speed of the engine is accelerated and when the pressure of the foot on the pedal is reduced or eliminated the control rod is drawn backwardly by a spring 22 or other suitable means, thereby reducing the fuel supply to the engine and decreasing its speed accordingly.

The preferred means for controlling the speed of the engine in accordance with this invention are constructed as follows:—

In front of the footboard is arranged a supporting frame in which the adjacent part of the control rod is supported and guided and which in its preferred form consists of two frame sections 23, 24 arranged horizontally side by side and are detachably connected by screws 25. The frame may be held stationary in any suitable manner, for example by a bracket or arm 26 projecting laterally from one of the frame sections and secured by bolts 27 to the adjacent part of the fuel intake manifold 28, as best shown in Fig. 5.

The inner opposing sides of the two frame sections are provided with semi-cylindrical grooves which together form a horizontal longitudinal guideway 29 which receives the control rod and serves as a guide for the latter in its horizontal longitudinal reciprocations. Within this guideway the control rod is provided with a notch 30 on its upper side forming a vertical forwardly facing stop shoulder 31 at the rear end of this notch, as shown in Figs. 2 and 3. Extending upwardly from the central part of the horizontal guideway 29 is a vertical guideway 32 formed between the opposing upper parts of the frame sections 23, 24, which vertical guideway receives a stop 33 having the form of a cylindrical block which is movable vertically in the guideway 29 so that this stop may either be lowered and stand with its lower end in the path of the shoulder 31, as shown in Fig. 2, or the stop may be elevated out of the path of the shoulder, as shown in Fig. 3.

When the stop is lowered into its operative position with the control or accelerator rod, the latter can only be moved forwardly until its shoulder 31 engages the stop 33, as shown in Fig. 2, thereby limiting the amount of fuel which can be delivered through the carburetor to the engine cylinders and preventing driving of the automobile in excess of that which is predetermined by the location of the stop shoulder 31 on the control rod. This shoulder is so placed that the speed of the automobile will be held down to that permissible in any particular locality or to meet certain conditions or requirements of rules governing the use of highways.

Upon raising the stop 33 out of the path of the shoulder 31 the control rod 17 may be pushed forwardly with its shoulder beyond the stop, as shown in Fig. 3, thereby operating the fuel control device so as to deliver a greater amount of fuel to the cylinders and cause the automobile to travel at a higher speed. Such increased speed is usually permissible on highways outside of the congested parts of cities and towns inasmuch as the danger of traffic accidents in such places is lessened, and automobiles may therefore be driven at higher speeds.

The stop 33 preferably has the opposite sides of its lower end flattened, as shown at 34 in order to increase the bearing surfaces of the same which are adapted to be engaged by the opposite ends of the notch 30 of which the forwardly facing one 31 serves to prevent excess forward movement of the accelerator or control rod during low speed operation of the car while the other rearwardly facing shoulder 35 formed by this notch prevents undue rearward movement of this rod. Rotation of the stop 33 is prevented by a spline or key 36 formed on the stop and working in a keyway or groove 37 in the supporting frame and thereby always maintaining the flat faces 34 of the stop 33 toward the shoulders 31, 35.

The means for moving the stop 33 into and out of its operative position relative to the control or accelerator rod are preferably constructed as follows:—

The numeral 38 represents a supporting case of cylindrical form mounted on the instrument panel 13 and 39 a guide tube of spirally wound wire connected at its opposite ends with the frame 23, 24 and supporting casing 38 and opening at its front end into the guideway 32 while its rear end opens into the supporting casing 38. Within this guide tube is arranged a longitudinally movable shifting rod or wire 40 which is connected at its lower front end with the upper end of the stop 33 while its upper rear end is connected with a follower 41 movable lengthwise in the front part of the casing 38. When the stop, follower and shifting wire are free, the same are automatically raised and yieldingly held in an elevated or retracted position by spring means consisting preferably of a spring 42 arranged within the supporting casing and bearing at its front end against the front head of the same while its rear end bears against said follower, as shown in Fig. 2.

A longitudinally movable plunger 43 is arranged within the rear part of the supporting casing and engages its front end with the follower 41 so that upon manually moving the plunger forwardly the stop 33 will be moved downwardly into the path of the stop shoulder 31 and upon releasing the plunger the same will be moved backwardly automatically by the spring 42 at the same time that the stop 33 is withdrawn from the path of the accelerator stop shoulder 31.

The forward movement of the plunger may be effected by any suitable means and the plunger may be held in its foremost or operative position by a locking device of any well-known type but it is preferable to employ for this purpose a locking bolt 44 which is mounted on said plunger so as to be movable longitudinally therewith and rotatable independently thereof and provided with a laterally projecting locking lug 45 adapted to slide in a longitudinal slot 46 in the casing 38 and move transversely in a transverse slot 47 therein, and a key 48 insertable in said bolt and adapted to actuate permutation or tumbler pins 49, 50 mounted respectively on the tumbler and casing for either locking together the bolt and the casing or permitting the bolt to move lengthwise and rotate relatively to the casing in the usual manner.

When driving the automobile in a territory where high speed is prohibited the operator inserts the key 48 into the bolt 44 thereby unlocking the same from the plunger 43. Thereafter the bolt is pushed forwardly whereby the follower 42, wire 40 and stop 33 are moved forwardly and the stop is moved downwardly into the notch 30 and into the path of the shoulder 31, as shown by full lines in Fig. 2. During this movement the detent lug 45 moves forwardly in the slot 46. After the plunger and bolt reach their foremost position the bolt is turned so as to carry the lug 45 into the transverse slot 47, thereby holding the bolt and plunger in the foremost position and retaining the stop 33 in front of the shoulder 31 of the accelerator rod. While the stop is in this position the accelerator rod can only be pushed forwardly by the pedal 21 until the shoulder 31 engages the stop 33 thereby limiting the amount of fuel which can be delivered to the engine cylinders and enabling the latter to operate only at such low speeds as has been predetermined to promote safety of travel on the highway.

When driving the automobile on a highway outside of congested areas, such as cities or villages, or in localities where there is a clear road and no restrictions as to high speed of automobiles are in force to promote safety, the key 48 may be turned so as to disengage the lug 45 from the transverse notch 47, thereby releasing the plunger and permitting the same, together with the bolt, follower, shifting wire and stop 33, to be moved rearwardly automatically by the spring 42, whereby this stop is moved out of the path of the shoulder 31 on the accelerator or control rod and the latter may be moved forward to a greater extent in order to deliver a greater amount of fuel to the engine for the purpose of driving the automobile at a speed higher than that possible when the forward movement of the control rod is arrested by the stop 33.

It will thus be apparent that by the use of this control mechanism the driver of the automobile can set the same so that he can not unintentionally drive the car at a speed in excess of that which has been predetermined to promote safety in certain zones of travel, but when traveling outside of these zones the driver can readily render the speed limiting mechanism inoperative and drive the car as fast as the power of the engine will permit.

Indicating means are provided which will automatically indicate whether the control device has been set to prevent operation of the car above a predetermined low speed or whether the car can be driven at a speed higher than said low speed, which means, as shown in Figs. 1 and 2, are preferably constructed as follows:—

The numeral 51 represents an indicator lamp which may be mounted on any suitable part of the automobile and which preferably has the form of an incandescent electric light bulb, and has one side of its luminescent filament grounded on some part of the metallic frame of the car. The numeral 52 represents a source of electric current, such as an electric generator or storage battery, one side of which is also grounded on the metal car frame. On the inner end of the supporting casing 38 are mounted two contacts 53, 54 which are insulated from each other and from the casing and have their inner ends exposed within the casing while their outer ends are connected respectively with the opposite side of said indicator lamp 49 and the opposite side of the electric current source 52. Mounted on the follower 41 but insulated therefrom is a switch contact or bridgepiece 55 which moves lengthwise with the follower for the purpose of engaging and disengaging opposite ends of this switch contact with the terminal contacts 53, 54.

When the follower is moved forwardly into a position in which the stop 33 arrests the forward movement of the control or accelerator rod before sufficient fuel can be delivered to the engine to operate the car at a high speed, then the bridge contact 55 engages the terminal contacts 53, 54 and closes the electric circuit containing the electric current source 50 and the signal lamp 51, whereby the latter is illuminated and indicates to the traffic officers and other persons in the highway that the respective car is traveling at a speed no higher than that predetermined by the setting of the control device and permissible in the respective locality.

When the driver gets beyond the restricted speed area and he withdraws the limiting stop for increasing the speed above the normal low speed limit, then the bridge contact 55 is disengaged from the terminal contacts 53, 54 whereby the indicator lamp 51 is extinguished and persons at the roadside are apprised of the fact that the fuel control mechanism has been set to operate the car at a relatively high speed.

By means of this indicating device the driver may operate the car in restricted areas without liability of being molested inasmuch as the lighted indicator lamp is unfailing evidence that the control mechanism of the car has been set so that the same cannot operate at a speed in excess of that which is permissible on the respective highway.

Instead of forming the shoulder 31 directly and in a fixed position on the control rod 17, as shown in Figs. 2 and 3, a shoulder 311 may be provided which is adjustable lengthwise on a throttle or control rod 171 of this character, as shown in Fig. 7, in which last mentioned form this shoulder 311 is formed on the front side of a collar or nut 312 which has an internal screw thread engaging with an external screw thread 313 on the rod or member 171. By this means the position of the shoulder 311 may be adjusted by turning the collar 312 in one direction or the other in order that the shoulder 311 will engage the stop 33 and arrest the further increase in the delivery of fuel to the engine cylinders when the speed of the automobile has reached a predetermined limit. To prevent disturbance of this adjustment the collar may be rigidly secured in place by a set screw 314 mounted on the collar and engaging the adjacent part of the control rod 171. These means permit of accurately adjusting the low speed limit of the car and by arranging the adjusting means within the frame or housing in which the control rod is guided tampering with the same is prevented and render the parts readily accessible for adjustment.

We claim as our invention:—

An automobile control device comprising a reciprocable control rod adapted to be operatively connected with the fuel supply means of the automobile and provided with a shoulder facing forwardly or in the direction in which the rod is moved for increasing the fuel supply, a movable stop adapted to be normally arranged in the path of said shoulder and to be engaged thereby for arresting the forward movement of said rod, a shifting wire having one end connected with said stop, a longitudinally movable plunger engaging with the opposite end of said shifting wire and adapted to be moved forwardly for moving the stop into the path of said shoulder, a locking device for holding said plunger in its forward position or releasing the same, and spring means for moving said stop out of the path of said shoulder when the plunger is released by said locking device.

JOHN W. TONG.
CHESTER O. THOMPSON.